(12) United States Patent
Tanaka et al.

(10) Patent No.: US 8,023,028 B2
(45) Date of Patent: Sep. 20, 2011

(54) SOLID-STATE IMAGING DEVICE

(75) Inventors: Hiroaki Tanaka, Fukuoka (JP); Isao Hirota, Kanagawa (JP)

(73) Assignee: Sony Corporation, Tokyo (JP)

( * ) Notice: Subject to any disclaimer, the term of this patent is extended or adjusted under 35 U.S.C. 154(b) by 713 days.

(21) Appl. No.: 12/013,752

(22) Filed: Jan. 14, 2008

(65) Prior Publication Data

US 2008/0174686 A1    Jul. 24, 2008

(30) Foreign Application Priority Data

Jan. 22, 2007    (JP) .................................. 2007-011179

(51) Int. Cl.
*H04N 5/335* (2006.01)
(52) U.S. Cl. ........................................................ 348/312
(58) Field of Classification Search .................. None
See application file for complete search history.

(56) References Cited

U.S. PATENT DOCUMENTS

| 4,816,918 | A * | 3/1989 | McGrath ........................ 348/324 |
| 6,785,027 | B1 * | 8/2004 | Ozumi ............................ 358/513 |
| 2006/0017831 | A1 * | 1/2006 | Tanaka ........................... 348/311 |

FOREIGN PATENT DOCUMENTS

| JP | 2000-286408 | 10/2000 |
| JP | 2001-186418 | 7/2001 |
| JP | 2001-186481 | 7/2001 |
| JP | 2004-096546 | 3/2004 |
| JP | 2005-039561 | 2/2005 |

OTHER PUBLICATIONS

A Japanese Office Action dated Jan. 6, 2009, issued in connection with counterpart Japanese Patent Application No. 2007-011179.
Japanese Office Action issued on May 28, 2009 in connection with counterpart JP Application No. 2007-011179.

* cited by examiner

*Primary Examiner* — Anthony J Daniels
(74) *Attorney, Agent, or Firm* — SNR Denton US LLP

(57) ABSTRACT

A solid-state imaging device and a charge transfer method are provided. The solid-state imaging device includes light receiving portions arranged in a matrix of rows and columns, vertical transfer portions, and a horizontal transfer portion. The vertical transfer portions are formed for each column of the matrix of the light receiving portions, for transferring charges transferred from the light receiving portions in a vertical direction. The horizontal transfer portion transfers the charges transferred from the vertical transfer portions in a horizontal direction. The vertical transfer portions divide the charges transferred to the vertical transfer portions and transfer the divided charges in the vertical direction. The horizontal transfer portion transfers the divided charges in a mixed state in the horizontal direction.

4 Claims, 19 Drawing Sheets

Related Art    FIG. 5
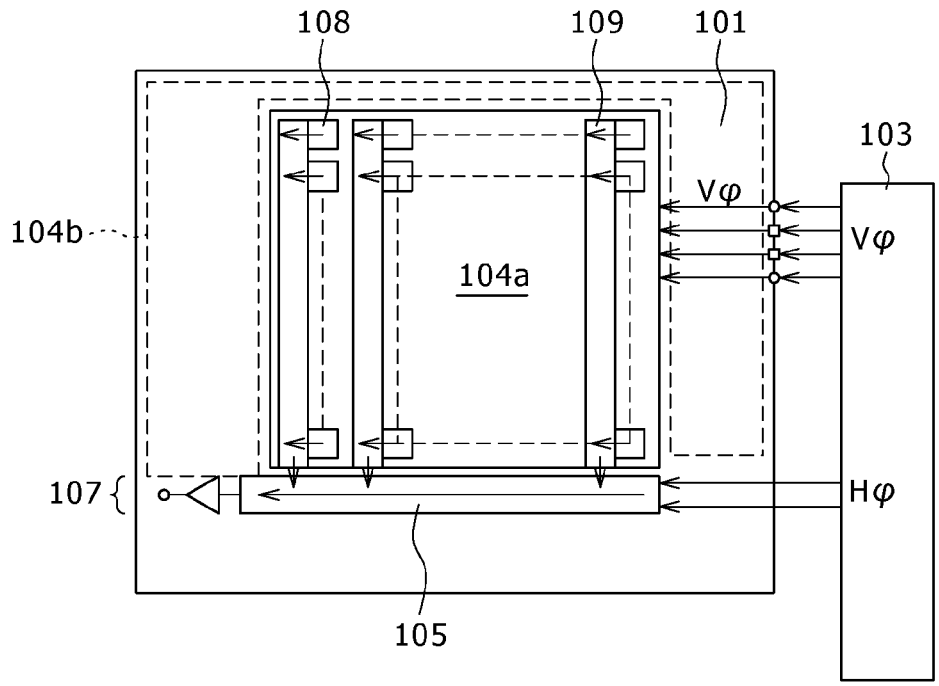
Related Art    FIG. 6A
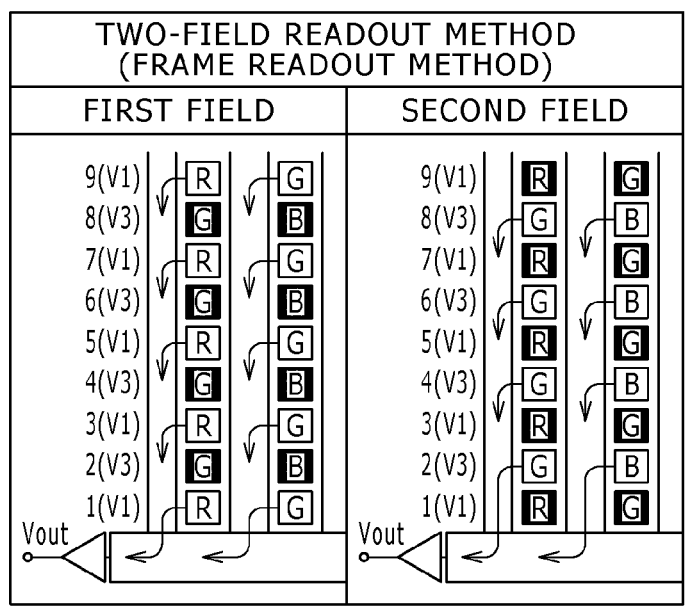

Related Art FIG. 6B
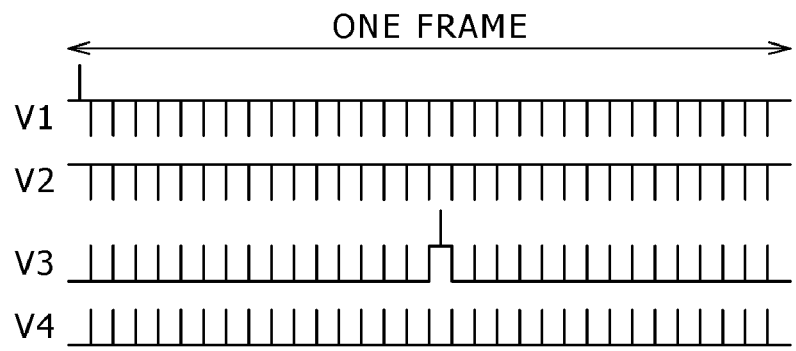
Related Art FIG. 6C
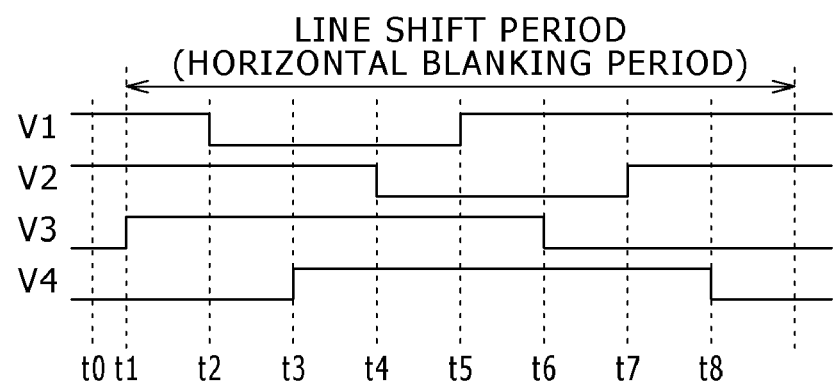

Related Art
FIG. 6D
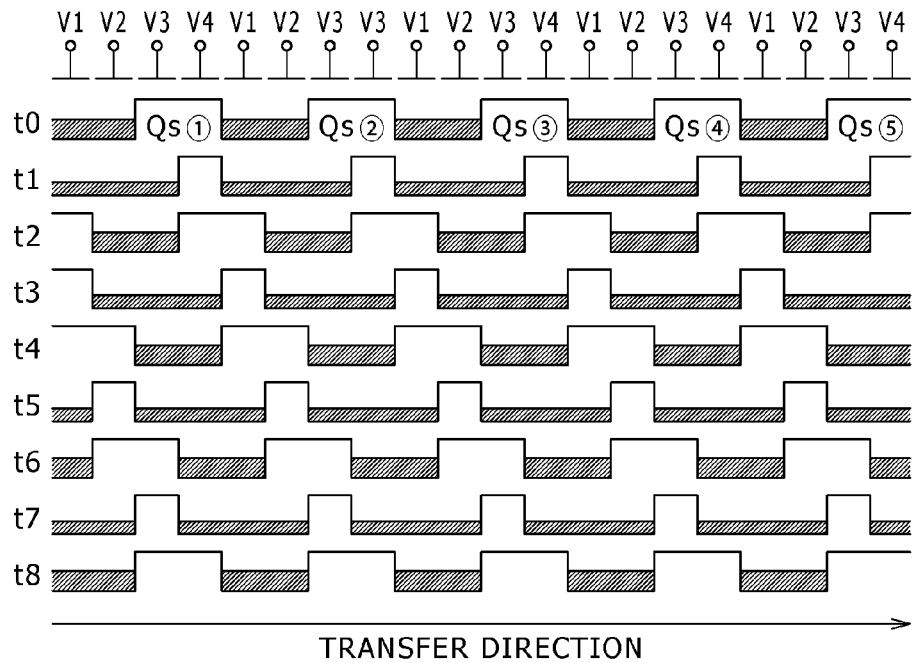
TRANSFER DIRECTION
Related Art    FIG. 7A
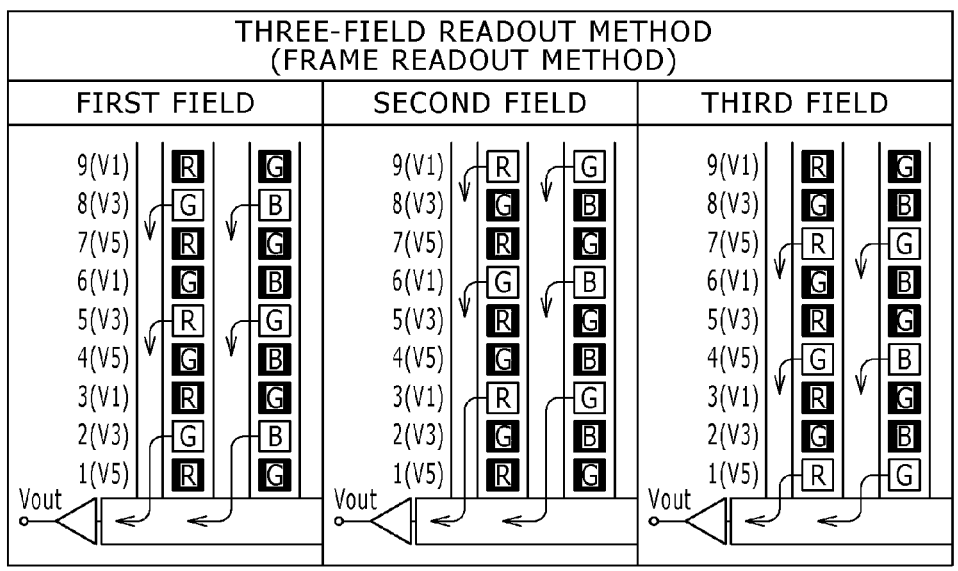

Related Art FIG.7B
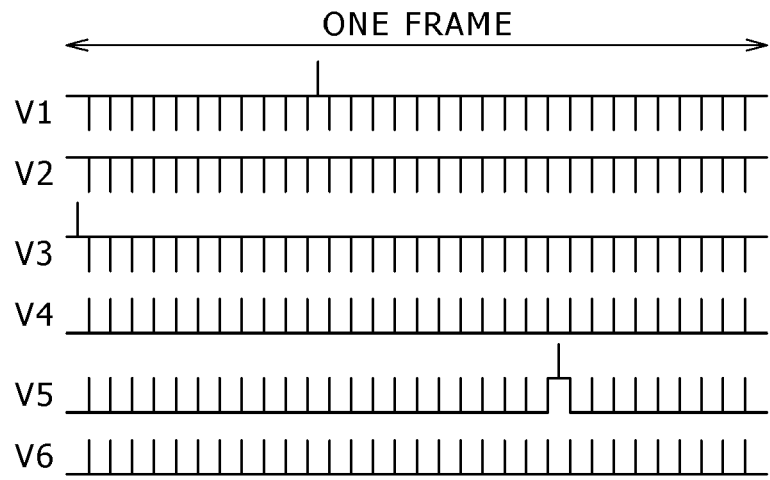
Related Art FIG.7C
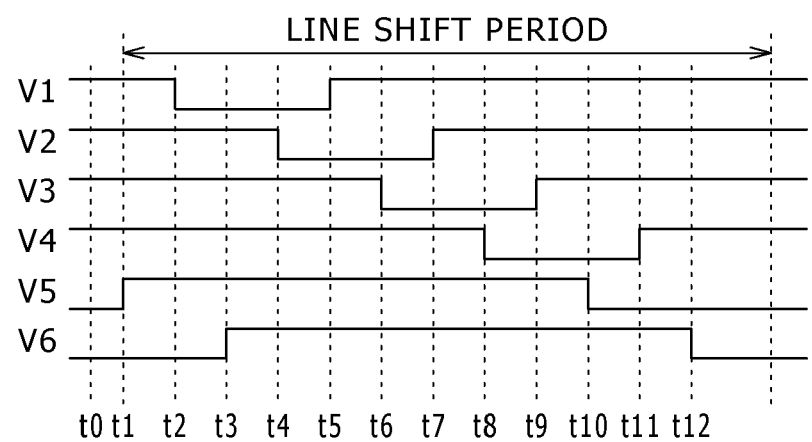

Related Art    FIG. 7D
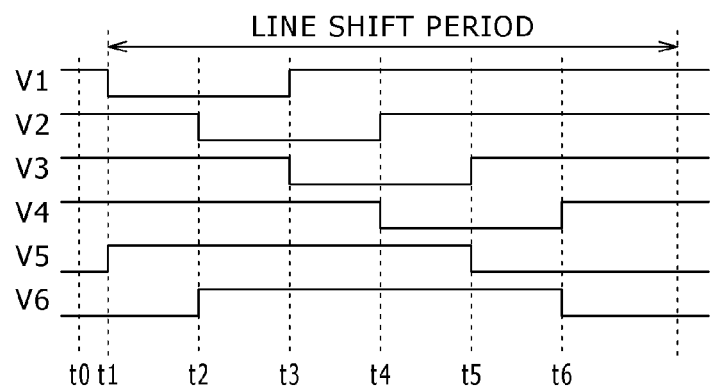
Related Art    FIG. 7E
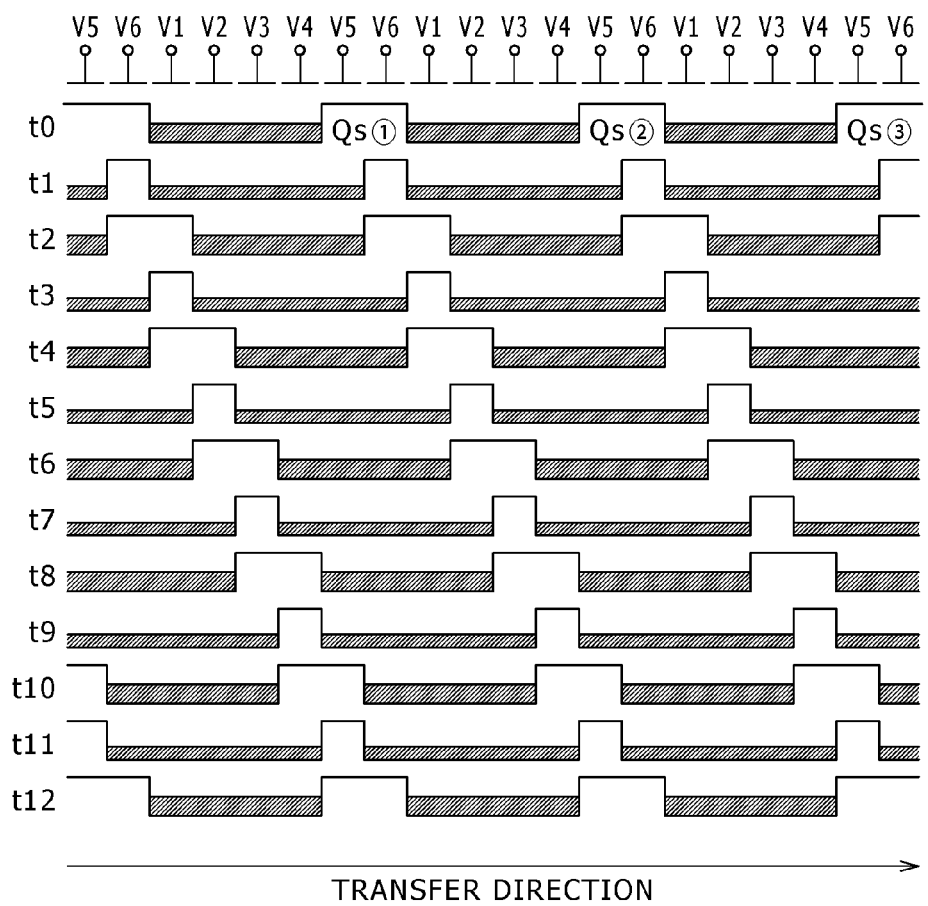

Related Art  FIG. 8A
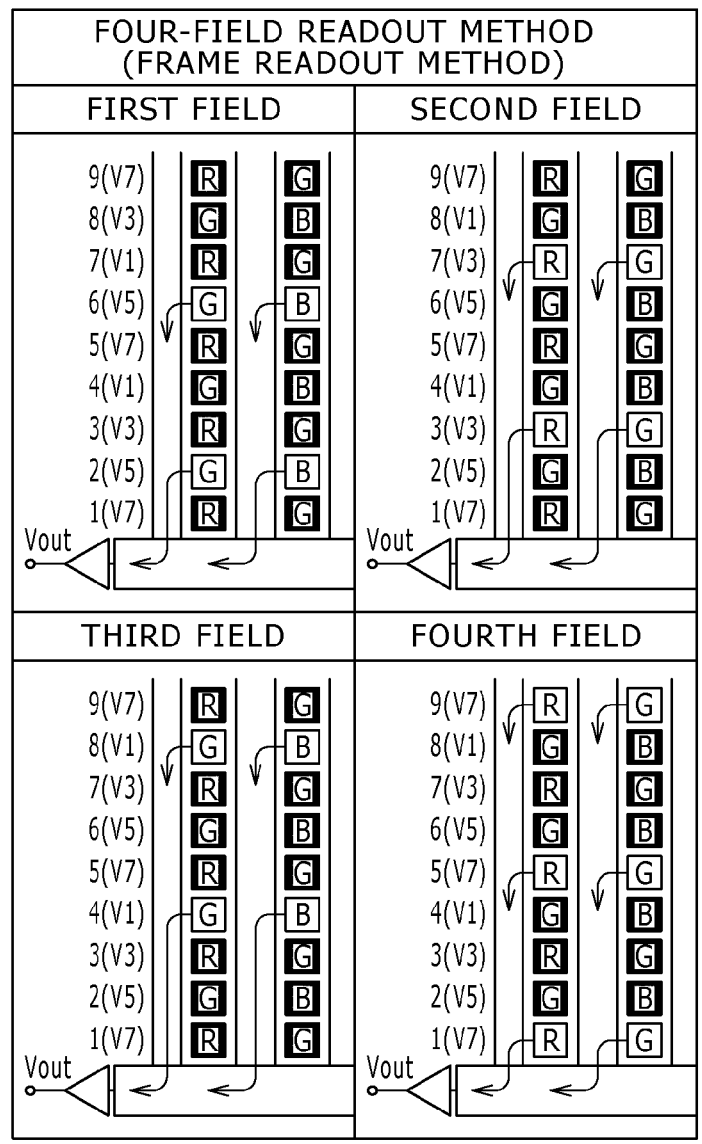

Related Art FIG. 8B
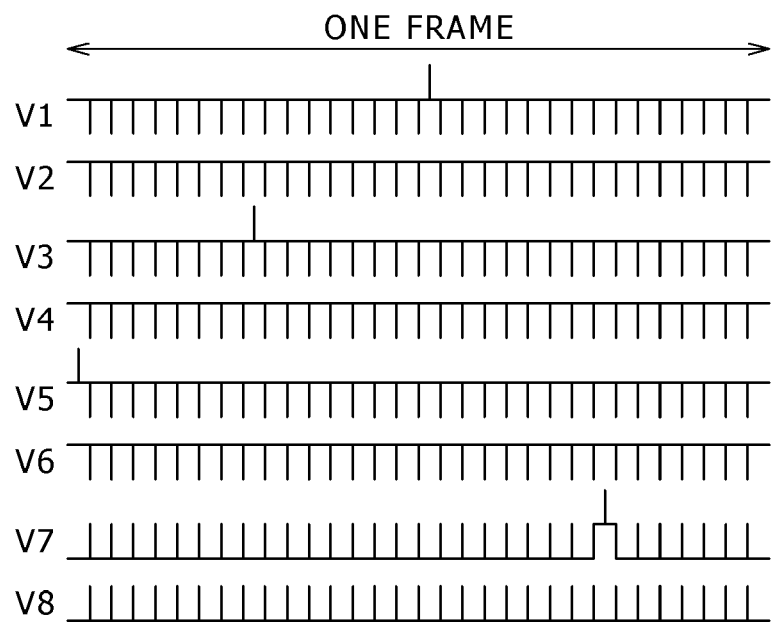
Related Art FIG. 8C
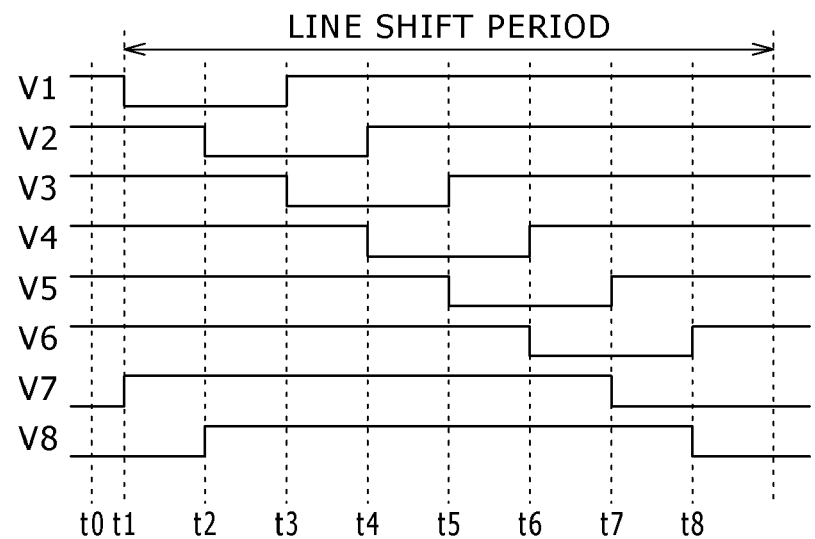

TRANSFER DIRECTION

Related Art FIG. 9A
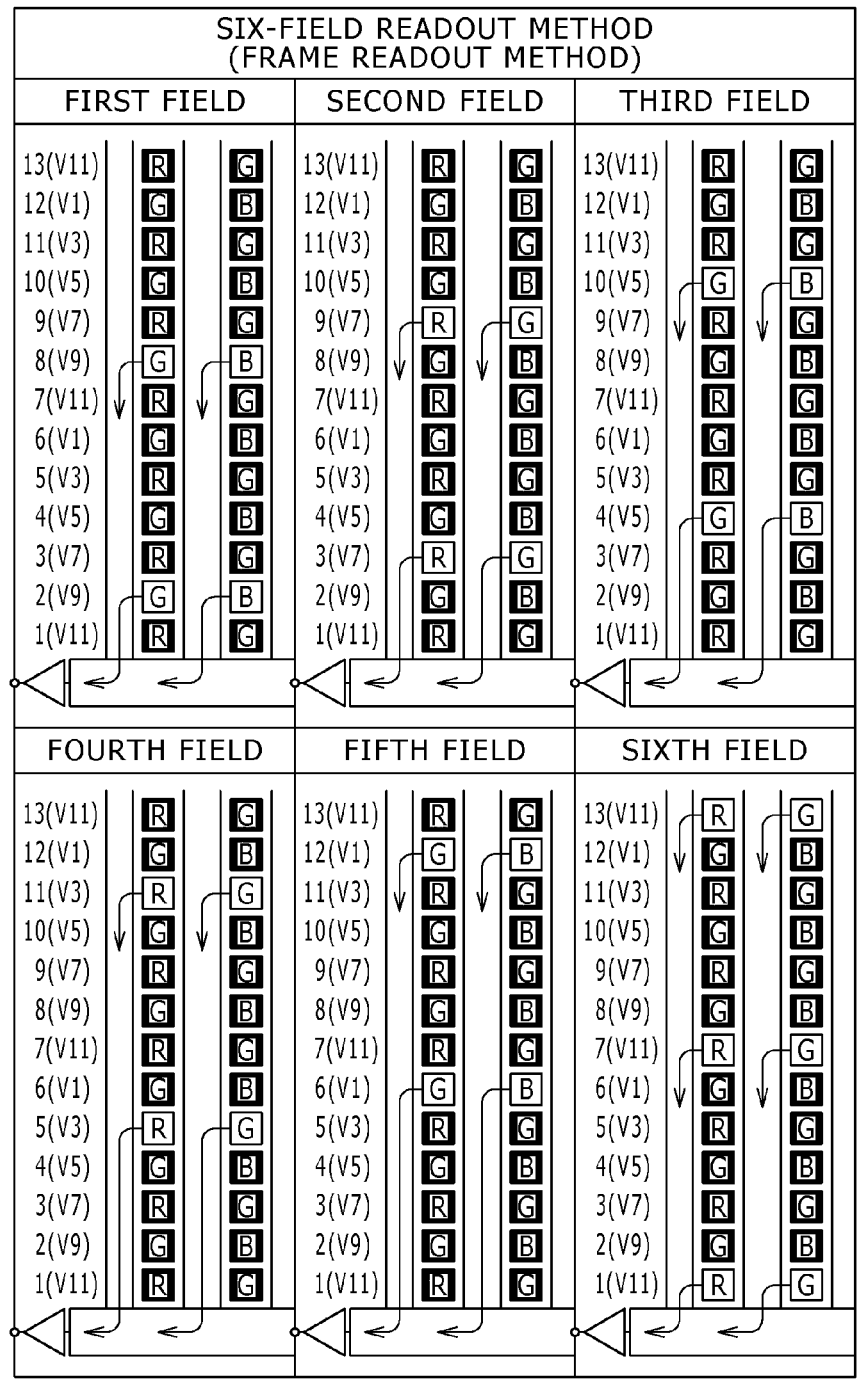

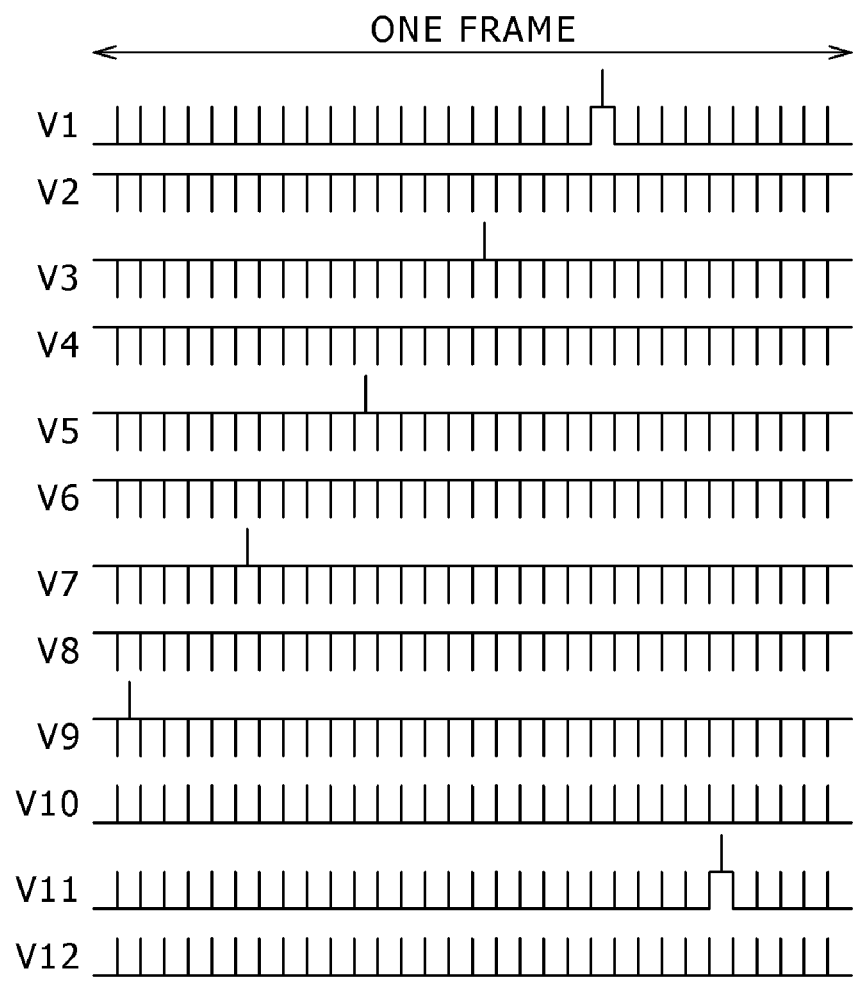
Related Art  FIG.9B

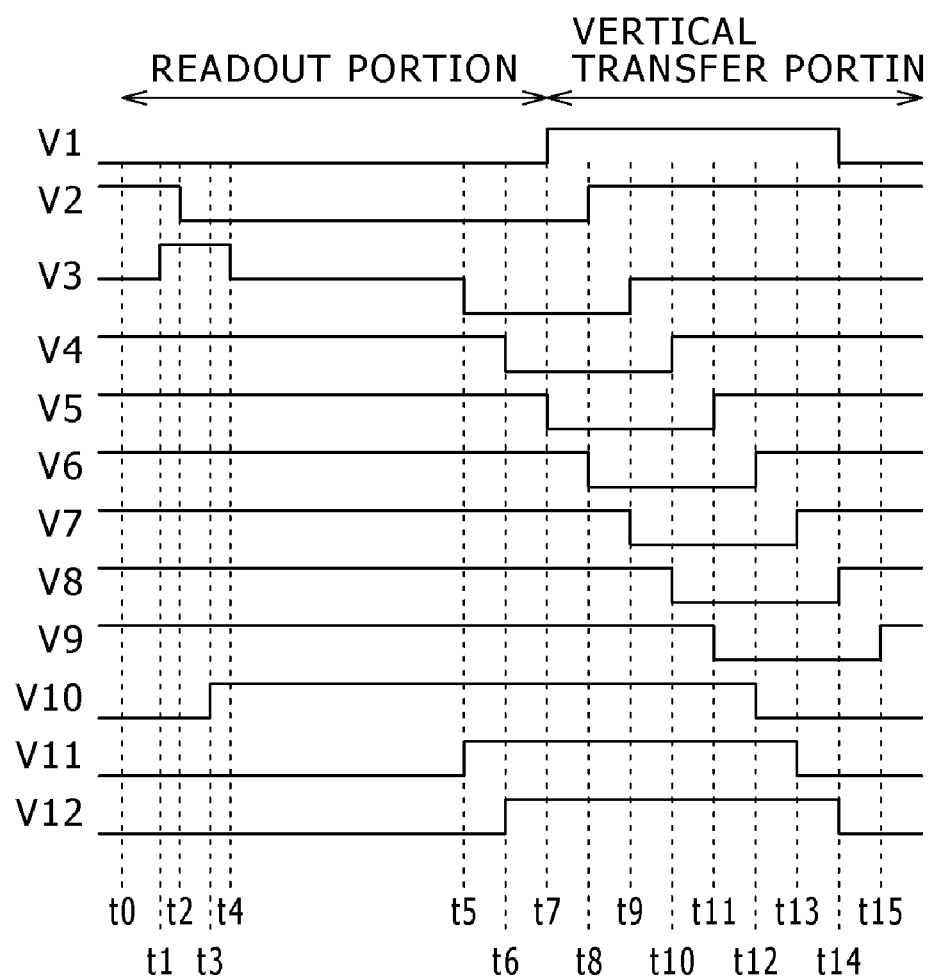

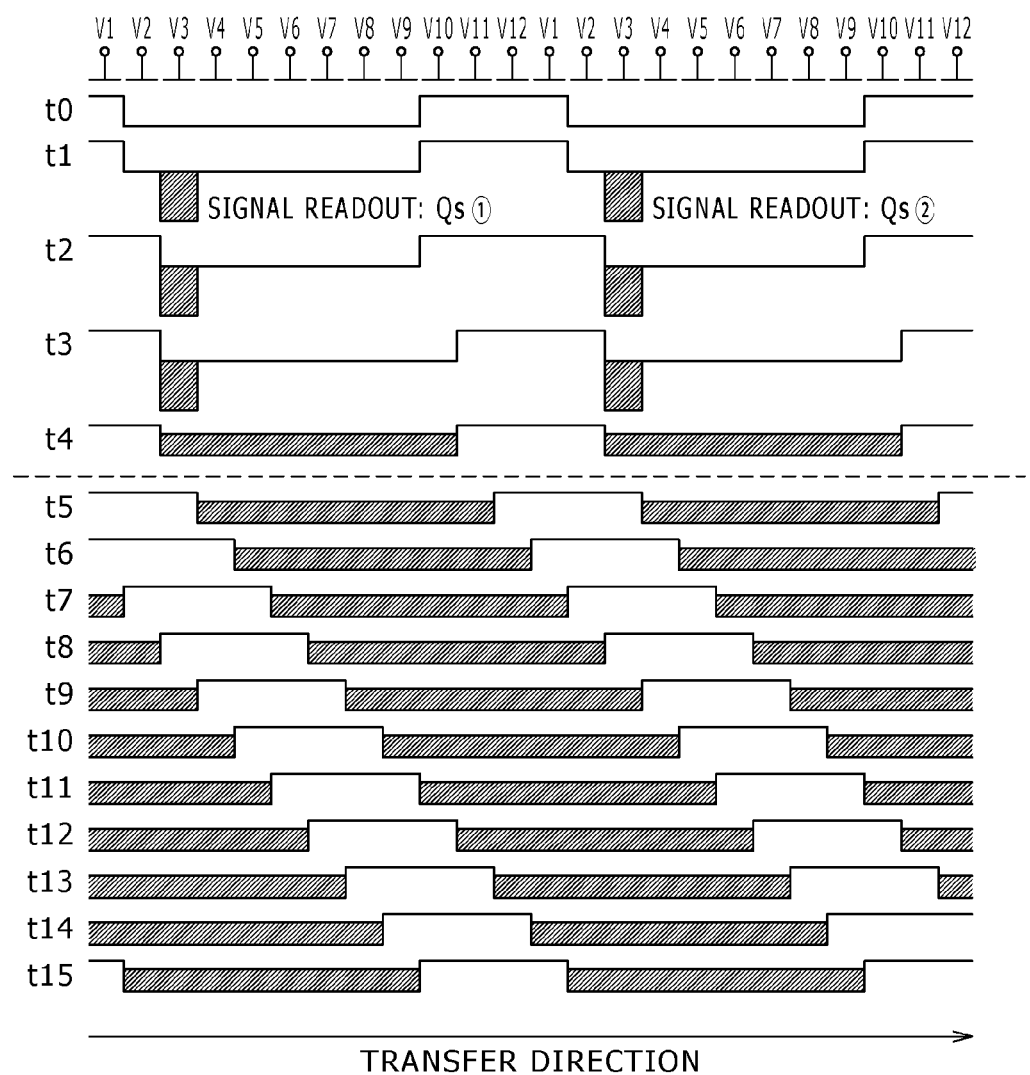
Related Art FIG. 9D

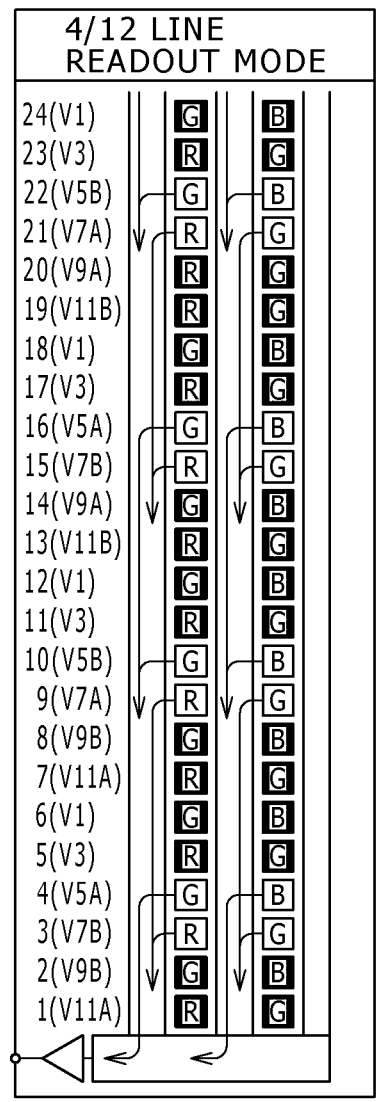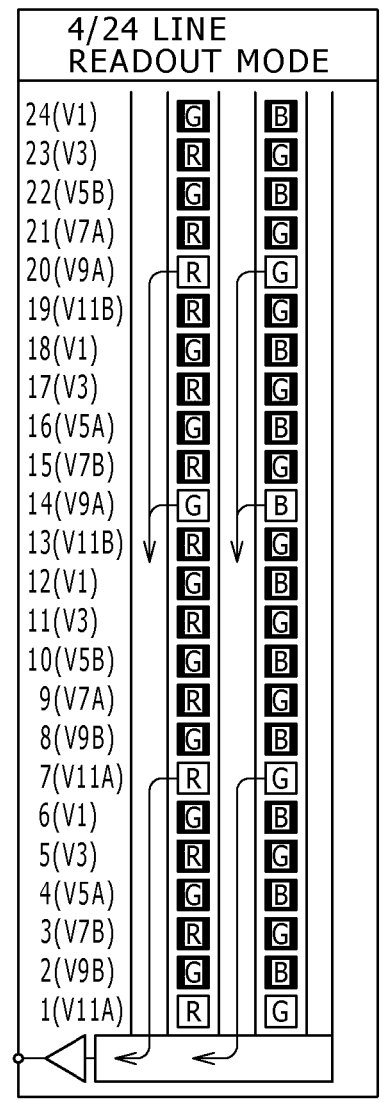

SOLID-STATE IMAGING DEVICE

BACKGROUND OF THE INVENTION

1. Field of the Invention

The present invention relates to a solid-state imaging device, and more particularly, to a solid-state imaging device that adopts a frame readout method.

2. Description of Related Art

In video cameras and digital still cameras, a solid-state imaging device of a charge coupled device (CCD) type using a CCD register in a charge transfer portion has been used (see, for example, Japanese Unexamined Patent Application Publication No. 2004-96546 (hereinafter referred to as "patent document 1")).

The CCD-type solid-state imaging device includes a plurality of pixels arranged in a two-dimensional matrix in an imaging area on a semiconductor substrate, each pixel having a photoelectric conversion means (photodiode; PD). The incident light into each pixel is converted into an electric charge by the photodiode, and the electric charge is transferred through a vertical transfer portion and a horizontal transfer portion to a floating diffusion (FD) region formed in an output amplifier. The potential change in the FD region is detected by a MOS transistor, converted into an electrical signal, and amplified the converted electrical signal to output an image signal.

FIG. 5 is a diagrammatic view for explaining a known CCD-type solid-state imaging device. The CCD-type solid-state imaging device 101 shown in the figure essentially includes an imaging portion 104a, an optical black region 104b, a horizontal transfer portion 105, and an output portion 107. The imaging portion includes light receiving portions 108 arranged in a matrix of rows and columns, and vertical transfer portions 109, formed for each column (vertical lines) of the light receiving portions, for transferring charges from each of the light receiving portions.

In the CCD-type solid-state imaging device configured as the described above, by applying vertical transfer clocks $V\phi$ to the vertical transfer portions from a timing signal generating circuit 103, electrical charges output from the light receiving portions to the vertical transfer portions are transferred in the vertical direction. Furthermore, by applying horizontal transfer clocks $H\phi$ to the horizontal transfer portion from the timing signal generating circuit, the electrical charges transferred to the horizontal transfer portion are transferred in the horizontal direction, and converted in an FD region to a voltage to thereby be readout as a light receiving signal from an output portion.

The CCD-type solid-state imaging device is required to take a still image with high resolution, and hence it is necessary that all pixel signals are outputted without mixing. Therefore, as an output method for the CCD-type solid-state imaging device, (1) a method in which all pixels are simultaneously outputted and the individual pixels are independently transferred (all-pixel readout mode, so-called "progressive scan readout method") or (2) a method in which charges of odd lines and even lines are alternately outputted per field and the individual pixels are independently transferred (frame readout method which means a two-field readout method here) has been used.

The frame readout method more advantageously secures a satisfactory amount of charges processed by the vertical transfer portions than the progressive scan method, and facilitates the reduction of cell size (size per one pixel), and therefore the frame readout method has been used in the CCD-type solid-state imaging device which is especially required to be reduced in size or increased in pixels. That is, the progressive scan method is required to form a packet of the vertical transfer portions for each pixel, whereas, in the frame readout method, one pixel of the two pixels is outputted in one field and therefore a packet of the vertical transfer portions is formed for the two pixels. Accordingly, the frame readout method more advantageously secures a satisfactory amount of charges processed by the vertical transfer portions than the progressive scan method, thereby facilitating the reduction of cell size.

FIGS. 6A-6D are diagrams for explaining frame readout (two-field readout) used for obtaining a still image with high resolution, wherein FIG. 6A is a diagram of frame readout (two-field readout) in which output (readout) is individually performed in two separate fields, i.e., the first field and the second field, FIG. 6B is a vertical synchronizing timing chart, FIG. 6C is a horizontal synchronizing timing chart, and FIG. 6D shows the transfer state of charges of the vertical transfer portions.

In the vertical transfer portions, a transfer electrode is formed to apply a readout clock for readout of the charges accumulated in the light receiving portions or a vertical transfer clock for vertical transfer by driving the vertical transfer portion. In the two-field readout method, in order to realize a drive of reading out one pixel of the two pixels (pixels of 1st line, 3rd line, 5th line, 7th line, 9th line, . . . shown in FIG. 6A) in the first field, and reading out the remaining one pixel of the two pixels (pixels of the 2nd line, 4th line, 6th line, 8th line, . . . shown in FIG. 6A) in the second field, readout clock separated from the pixel outputted in the first field and the pixel outputted in the second field needs to be applied. Furthermore, it is necessary to form another transfer electrode between the transfer electrodes to which the readout clocks is applied to prevent color mixing. Therefore, four transfer electrodes (V1 to V4) are needed in the two-field readout method.

In FIG. 6A, only the transfer electrodes V1, V3 to which the readout clocks are applied are shown, however transfer electrodes V2 are formed between the 2nd line and the 3rd line, between the 4th line and the 5th line, between the 6th line and the 7th line, and between the 8th line and the 9th line, and transfer electrodes V4 are formed between the 1st line and the 2nd line, between the 3rd line and the 4th line, between the 5th line and the 6th line, and between the 7th line and the 8th line.

In recent years, the cell size tends to be further miniaturized to improve the resolution (increase the number of pixels) or to reduce the device size, and, with respect to the frame readout method, in addition to the two-field readout method in which output (readout) is individually performed in two separate fields, a three-field readout method shown in FIGS. 7A-7F (FIG. 7A is a diagram of a three-field readout method, FIG. 7B is a vertical synchronizing timing chart, FIG. 7C is a horizontal synchronizing timing chart (1), FIG. 7D is a horizontal synchronizing timing chart (2), FIG. 7E shows the transfer state of charges of the vertical transfer portions corresponding to the horizontal synchronizing timing chart (1), and FIG. 7F shows the transfer state of charges of the vertical transfer portions corresponding to the horizontal synchronizing timing chart (2)), a four-field readout method shown in FIGS. 8A-8D (FIG. 8A is a diagram of a four-field readout method, FIG. 8B is a vertical synchronizing timing chart, FIG. 8C is a horizontal synchronizing timing chart, and FIG. 8D shows the transfer state of charges of the vertical transfer portions), a not shown five-field readout method, and a six-field readout method shown in FIGS. 9A-9D (FIG. 9A is a diagram of a six-field readout method, FIG. 9B is a vertical synchronizing timing chart, FIG. 9C is a timing chart for the readout portion and vertical transfer portions, and FIG. 9D shows the transfer state of charges of the vertical transfer portions) have been put into practical use.

In the three-field readout method, in order to realize a method of reading out one pixel of the three pixels (pixels of the 2nd line, 5th line, 8th line, . . . shown in FIG. 7A) in the first field, reading out the remaining two pixels of the three pixels (pixels of the 3rd line, 6th line, 9th line, . . . shown in FIG. 7A) in the second field, and reading out the remaining one pixel of the three pixels (pixels of the 1st line, 4th line, 7th line, . . . shown in FIG. 7A) in the third field, readout clock separated from the pixel outputted in the first field, the pixel outputted in the second field, and the pixel outputted in the third field needs to be applied needs to be applied. Furthermore, it is necessary to form another transfer electrode between the transfer electrodes to which the readout clocks are applied to prevent color mixing. Therefore, the three-field readout method needs six transfer electrodes (V1 to V6).

In FIG. 7A, only the transfer electrodes V1, V3, V5 to which the readout clocks are applied are shown, however, transfer electrodes V2 are formed between the 2nd line and the 3rd line, between the 5th line and the 6th line, and between the 8th line and the 9th line, transfer electrodes V4 are formed between the 1st line and the 2nd line, between the 4th line and the 5th line, and between the 7th line and the 8th line, and transfer electrodes V6 are formed between the 3rd line and the 4th line and between the 6th line and the 7th line.

In the four-field readout method, in order to realize a drive method of reading out one pixel of the four pixels (pixels on the 2nd line, 6th line, . . . shown in FIG. 8A) in the first field, reading out one pixel of the remaining three pixels of the four pixels (pixels on the 3rd line, 7th line, . . . shown in FIG. 8A) in the second field, reading out one pixel of the remaining two pixels of the four pixels (pixels of the 4th line, 8th line, . . . shown in FIG. 8A) in the third field, and reading out the remaining one pixel of the four pixels (pixels of the 1st line, 5th line, 9th line, . . . shown in FIG. 8A) in the fourth filed, readout clock separated from the pixel outputted in the first filed, the pixel outputted in the second field, the pixel outputted in the third field, and the pixel outputted in the fourth field needs to be applied. Furthermore, it is also necessary to form another transfer electrode between the transfer electrodes to which the readout clocks are applied to prevent color mixing. Therefore, the fourth-field readout method needs eight transfer electrodes (V1 to V8).

In FIG. 8A, only the transfer electrodes V1, V3, V5, V7 to which the readout clocks are applied are shown, but, transfer electrodes V2 are formed between the 3rd line and the 4th line and between the 7th line and the 8th line, transfer electrodes V4 are formed between the 2nd line and the 3rd line and between the 6th line and the 7th line, transfer electrodes V6 are formed between the 1st line and the 2nd line and between the 5th line and the 6th line, and transfer electrodes V8 are formed between the 4th line and the 5th line and between the 8th line and the 9th line.

In the six-field readout method, in order to realize a drive method of reading out one pixel of the six pixels (pixels on the 2nd line, 8th line, . . . shown in FIG. 9A) in the first field, reading out one pixel of the remaining five pixels of the six pixels (pixels on the 3rd line, 9th line, . . . shown in FIG. 9A) in the second field, one pixel of the remaining four pixels of the six pixels (pixels on the 4th line, 10th line, . . . shown in FIG. 9A) in the third field, one pixel of the remaining three pixels of the six pixels (pixels on the 5th line, 11th line, . . . shown in FIG. 9A) in the fourth field, and one pixel of the remaining two pixels of the six pixels (pixels on the 6th line, 12th line, . . . shown in FIG. 9A) in the fifth field, and the remaining one pixel of the six pixels (pixels on the 1st line, 7th line, 13th line, . . . shown in FIG. 9A) in the sixth field, readout clock separated from the pixel outputted in the first field, the pixel outputted in the second field, the pixel outputted in the third field, the pixel outputted in the fourth field, the pixel outputted in the fifth field, and the pixel outputted in the sixth field needs to be applied. Furthermore, it is necessary to form another transfer electrode between the transfer electrodes to which the readout clocks are applied to prevent color mixing. Therefore, the six-field readout method needs twelve transfer electrodes (V1 to V12).

In FIG. 9A, only the transfer electrodes V1, V3, V5, V7, V9, V11 to which the readout clocks are applied are shown, but, transfer electrodes V2 are formed between the 5th line and the 6th line and between the 11th line and the 12th line, transfer electrodes V4 are formed between the 4th line and the 5th line and between the 10th line and the 11th line, transfer electrodes V6 are formed between the 3rd line and the 4th line and between the 9th line and the 10th line, transfer electrodes V8 are formed between the 2nd line and the 3rd line and between the 8th line and the 9th line, transfer electrodes V10 are formed between the 1st line and the 2nd line and between the 7th line and the 8th line, and transfer electrodes V12 are formed between the 6th line and the 7th line and between the 12th line and the 13th line.

In the above-described multi-field readout method (three-field readout method, four-field readout method, five-field readout method, or six-field readout method), the amount of charges processed by the vertical transfer portions may be increased, as compared to that in a known two-field readout method.

Namely, in the known two-field readout method, one pixel of the two pixels is outputted in one field (see FIG. 6A), so that a packet of the vertical transfer portions is constituted by the two pixels (V1 to V4) (see FIG. 6B). By contrast, in the three-field readout method, only one pixel of the three pixels is outputted in one field (see FIG. 7A), so that a packet of the vertical transfer portions is constituted by the three pixels (V1 to V6) (see FIG. 7B). The on-state gates (the number of gates to which a high-level potential is applied) of the vertical transfer portions in the two-field readout method are two gates, whereas the number in the three-field readout method is four, which indicates that the amount of charges processed by the vertical transfer portions may be increased in the three-field readout method. Similarly, in the four-field readout method, only one pixel of the four pixels is outputted in one field (see FIG. 8A), so that a packet of the vertical transfer portions is constituted by the four pixels (V1 to V8) (see FIG. 8B). Therefore, the on-state gates of the vertical transfer portions in the four-field readout method are six gates. In the six-field readout method, only one pixel of the six pixels is outputted in a single field (see FIG. 9A), so that a packet of the vertical transfer portions is constituted by the six pixels (V1 to V12) (see FIG. 9B). Therefore, the on-state gates of the vertical transfer portions in the six-field readout method are eight gates. From the above, the amount of charges processed by the vertical transfer portions may be further increased in the multi-field readout method.

Accordingly, the multi-field readout method secures a satisfactory amount of charges processed by the vertical transfer portions even if the cell size is reduced, and whereby it may be applied to the CCD-type solid-state imaging device which is required to be improved in resolution or reduced in size.

In the three-field readout method (V1 to V6 six-phase transfer) shown in FIGS. 7A-7F, FIG. 7E shows a potential of the transfer state of charges of the vertical transfer portions corresponding to the horizontal synchronizing timing chart (1) (see FIG. 7C), and FIG. 7F shows a potential of the transfer state of charges of the vertical transfer portions corresponding to the horizontal synchronizing timing chart (2) (see FIG. 7D), and both operations may be used according to the horizontal synchronizing timing chart, but, when the forward gate in the transfer direction of charges is in the on state (state in which a high-level potential is applied) and simultaneously the backward gate in the transfer direction of charges is in the off state (state in which a low-level potential is applied), the number of clock changing points and the number of transfer cycles may be reduced in the operation shown in FIGS. 7D and 7F, as compared to those in the operation shown in FIGS. 7C and 7E. Especially, if a higher priority is given to the transfer speed or there is a demand for extending an overlap period of the vertical transfer clock (a period of time between a changing point of the vertical transfer clock and the next changing point) in the same period, the operation shown in FIGS. 7D and 7F is used. Further, if a four- or more multi-field readout method is employed as a readout method, the number of clock changing points is likely to be too large, and therefore a transfer method in which the forward gate in the transfer direction is turned on and simultaneously the downward gate is turned off is employed actively.

SUMMARY OF THE INVENTION

As mentioned above, in the multi-field readout method, the amount of charges processed by the vertical transfer portions may be increased, but the number of transfer electrodes of the vertical transfer portions is disadvantageously increased. Specifically, the vertical transfer portions in the two-field readout method have four transfer electrode (V1 to V4), whereas the three-field readout method has six transfer electrodes (V1 to V6), the four-field readout method has eight transfer electrodes (V1 to V8), and the six-field readout method has twelve transfer electrodes (V1 to V12), and thus the number of transfer electrodes of the vertical transfer portions is increased.

Recently, digital still cameras have an operation mode having a response rate (frame rate) higher than that of a still image, for display on a liquid crystal display monitor or the like or for automatic control, such as auto-focus (AF) or auto-exposure (AE), and a line thinning operation is generally carried out to improve the response rate. For achieving such a thinning operation, an electrode functioning as a readout electrode for charges needs to be divided into a plurality of electrodes, which leads to further increasing the number of transfer electrodes of the vertical transfer portions.

For example, FIG. 10 is a diagram for explaining a line thinning mode in the six-field readout method. In this mode, the readout electrodes (electrodes designated by reference numerals V5, V7, V9, and V11) need to be individually divided into two electrodes (electrodes designated by reference numerals V5A, V5B, V7A, V7B, V9A, V9B, V11A, and V11B), and therefore the number of transfer electrodes of the vertical transfer portions is increased from twelve (V1 to V12) to sixteen (V1, V2, V3, V4, V5A, V5B, V6, V7A, V7B, V8, V9A, V9B, V10, V11A, V11B, V12), as compared to the number in the case where line thinning is not conducted (see FIG. 9A).

An increase in the number of transfer electrodes of the vertical transfer portions disadvantageously may result in increasing in cost along with increasing size of the CCD-type solid-state imaging device, increasing size of package due to the increasing the number of pin of a package, or increasing in cost along with increasing the number of channel of a vertical driver.

The present invention addresses the above issues associated with the developing technologies to provide a solid-state imaging device which is advantageous in that the number of transfer electrodes of the vertical transfer portions can be reduced.

In accordance with an embodiment of the present invention, there is provided a solid-state imaging device including: a plurality of light receiving portions arranged in a matrix of rows and columns; a plurality of vertical transfer portions, formed for each column of the matrix of the light receiving portions, for transferring charges transferred from the light receiving portions in a vertical direction; and a horizontal transfer portion for transferring the charges transferred from the vertical transfer portions in a horizontal direction. The vertical transfer portions divide substantially evenly the charges transferred to the vertical transfer portions into two and the transfer the divided charges in the vertical direction. The horizontal transfer portion transfers the divided charges in a mixed state in the horizontal direction.

In accordance with another embodiment of the present invention, there is provided a method for transferring charge by multi-field readout in a solid state imaging device, the method including the steps of: transferring the charges from the light receiving portions to a high-level potential portion in a vertical transfer portion; thereafter dividing substantially evenly the charges transferred to the vertical transfer portion into two and transferring the divided charges in the vertical direction; and transferring the divided charges in a mixed state in the horizontal direction in the horizontal transfer portion.

According to an embodiment of the present invention, the vertical transfer portions divide the charges transferred to the vertical transfer portions and transfer the divided charges in the vertical direction. Therefore, the number of vertical transfer phases of the vertical transfer portions can be reduced to thereby reduce the number of transfer electrodes of the vertical transfer portions.

Further, the horizontal transfer portion transfers in the horizontal direction the divided charges in a mixed state, and therefore there is no need to increase the driving frequency of the horizontal transfer portion.

Namely, when the divided charges are horizontal-transferred at a response rate (frame rate) equivalent to the rate at which charges which are not divided are horizontal-transferred, the transfer rate of the horizontal transfer portion needs to be increased. Accordingly, there is a need to increase the driving frequency of the horizontal transfer portion due to increasing the transfer rate of the horizontal transfer portion. In contrast, if the divided charges in a mixed state are horizontal-transferred at a response rate (frame rate) equivalent to the rate at which charges which are not divided are horizontal-transferred, there is no need to increase the transfer rate of the horizontal transfer portion. Therefore, there is no need to increase the driving frequency of the horizontal transfer portion.

BRIEF DESCRIPTION OF THE DRAWINGS

FIG. 5 is a diagrammatic view for explaining a known CCD-type solid-state imaging device.

FIG. 6A is a diagram of frame readout (two-field readout) in which output (readout) is individually performed in two separate fields, i.e., the first field and the second field.

FIG. 6B is a vertical synchronizing timing chart.

FIG. 6C is a horizontal synchronizing timing chart.

FIG. 6D is a diagram showing the transfer state of charges of the vertical transfer portions.

FIG. 7A is a diagram of a three-field readout method.

FIG. 7B is a vertical synchronizing timing chart.

FIG. 7C is a horizontal synchronizing timing chart (1).

FIG. 7D is a horizontal synchronizing timing chart (2).

FIG. 7E is a diagram showing the transfer state of charges of the vertical transfer portions corresponding to the horizontal synchronizing timing chart (1).

FIG. 8A is a diagram of a four-field readout method.

FIG. 8B is a vertical synchronizing timing chart.

FIG. 8C is a horizontal synchronizing timing chart.

FIG. 9A is a diagram of a six-field readout method.

FIG. 9B is a vertical synchronizing timing chart.

FIG. 9C is a timing chart for the readout portion and vertical transfer portions.

FIG. 9D is a diagram showing the transfer state of charges of the vertical transfer portions.

FIG. 10 is a diagram for explaining a line thinning mode in the six-field readout method.

DETAILED DESCRIPTION OF EMBODIMENTS

Hereinbelow, embodiments of the present invention will be described in detail with reference to the accompanying drawings for an understanding of the present invention.

Figure 1:
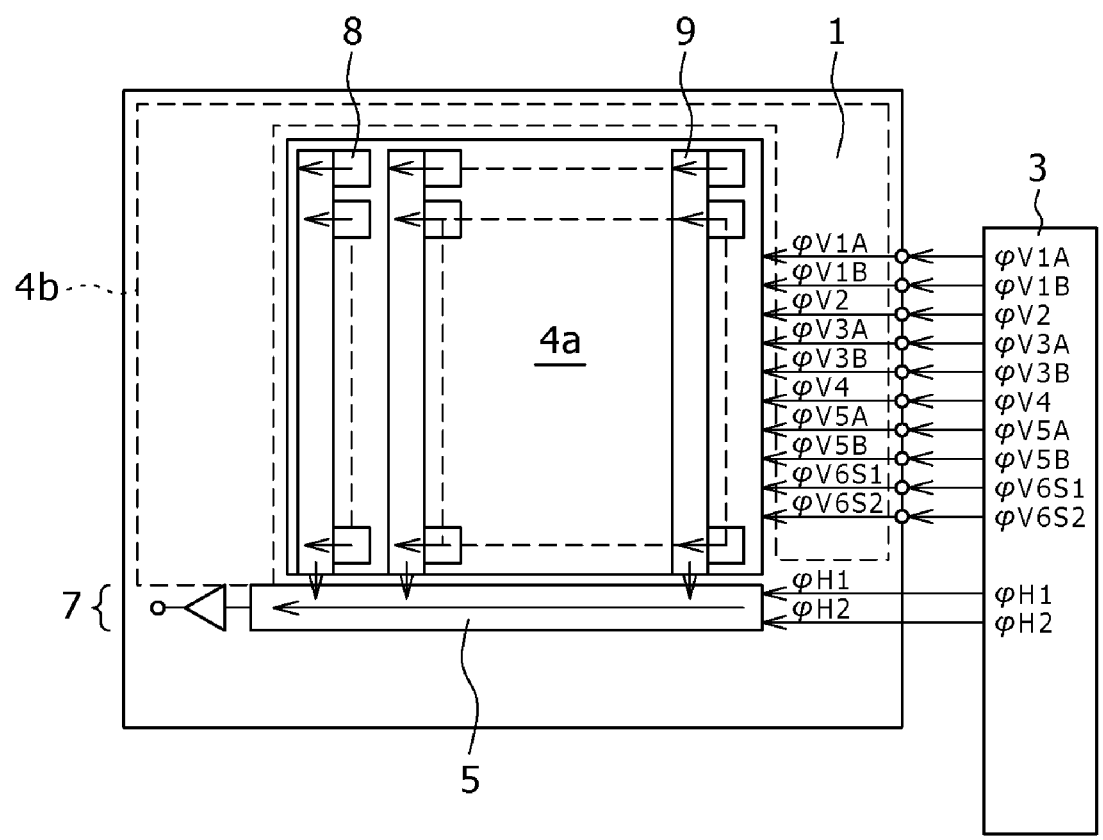
FIG. 1 is a diagrammatic view for explaining a CCD-type solid-state imaging device employing a six-field readout method, which is an example of the solid-state imaging device of the present invention.

FIG. 1 is a diagrammatic view for explaining a CCD-type solid-state imaging device employing a six-field readout method, which is an example of the solid-state imaging device by an embodiment of the present invention. Like the above-described known CCD-type solid-state imaging device, a CCD-type solid-state imaging device 1 shown in the figure includes an imaging portion 4a, an optical black region 4b, a horizontal transfer portion 5, and an output portion 7. The imaging portion includes a plurality of light receiving portions 8 arranged in a matrix of rows and columns, and vertical transfer portions 9, formed for each column of the matrix of the light receiving portions, for transferring charges from the individual light receiving portions.

In the CCD-type solid-state imaging device having the above construction, by applying vertical transfer clocks Vϕ (Vϕ1A, Vϕ1B, Vϕ2, Vϕ3A, Vϕ3B, Vϕ4, Vϕ5A, Vϕ5B, Vϕ6S1, Vϕ6S2) to the vertical transfer portions from a timing signal generating circuit 3, charges output from the light receiving portions to the vertical transfer portions are transferred in the vertical direction, and, by applying horizontal transfer clocks Hϕ (Hϕ1, Hϕ2) to the horizontal transfer portion from the timing signal generating circuit, the charges transferred to the horizontal transfer portion are transferred, and converted by an FD region to a voltage, which is output as a light receiving signal from the output portion.

Figure 2A:
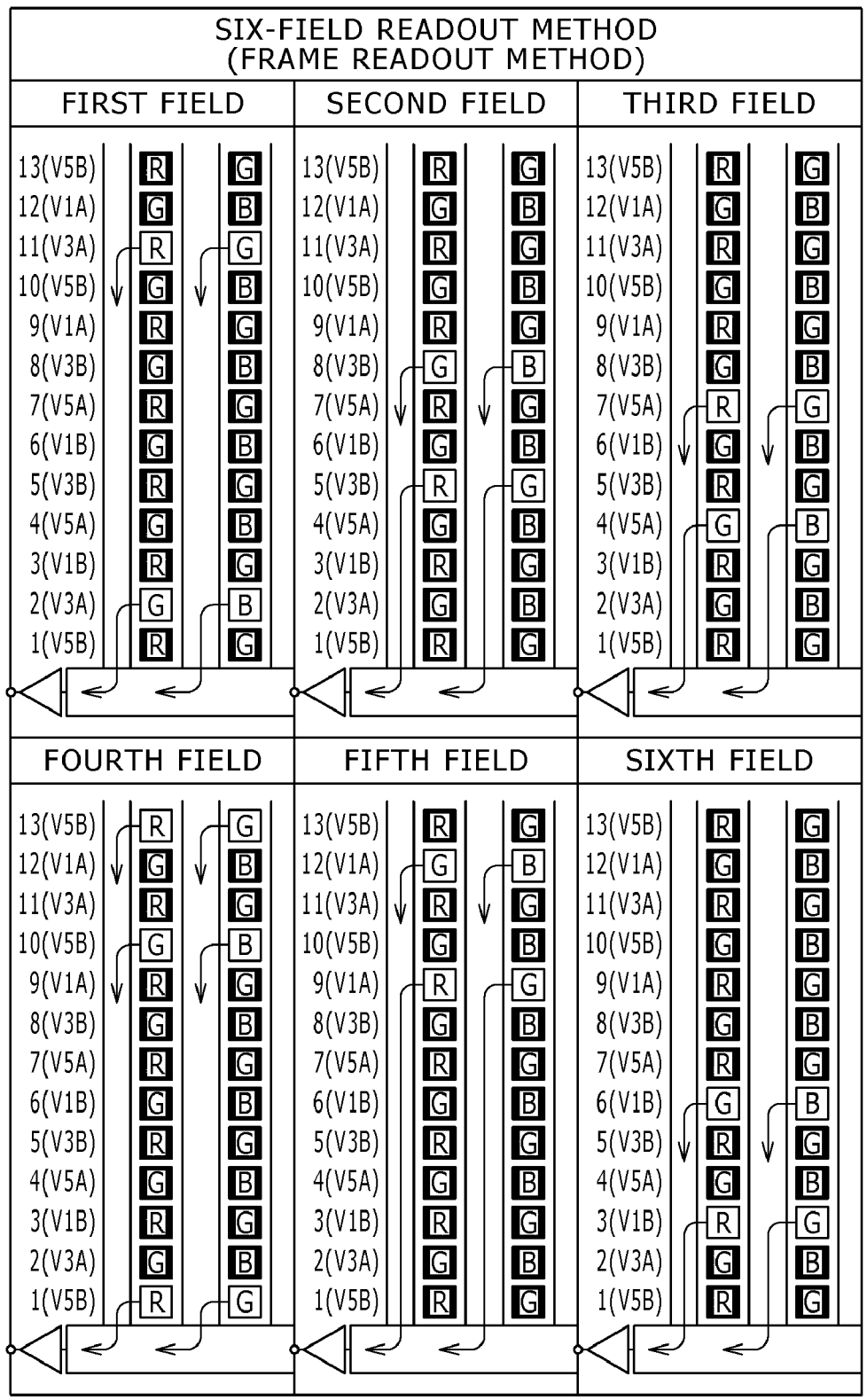
FIG. 2A is a diagram of six-field readout in which output (readout) is individually performed in six separate fields, i.e., the first field through sixth field.
Figure 2B:
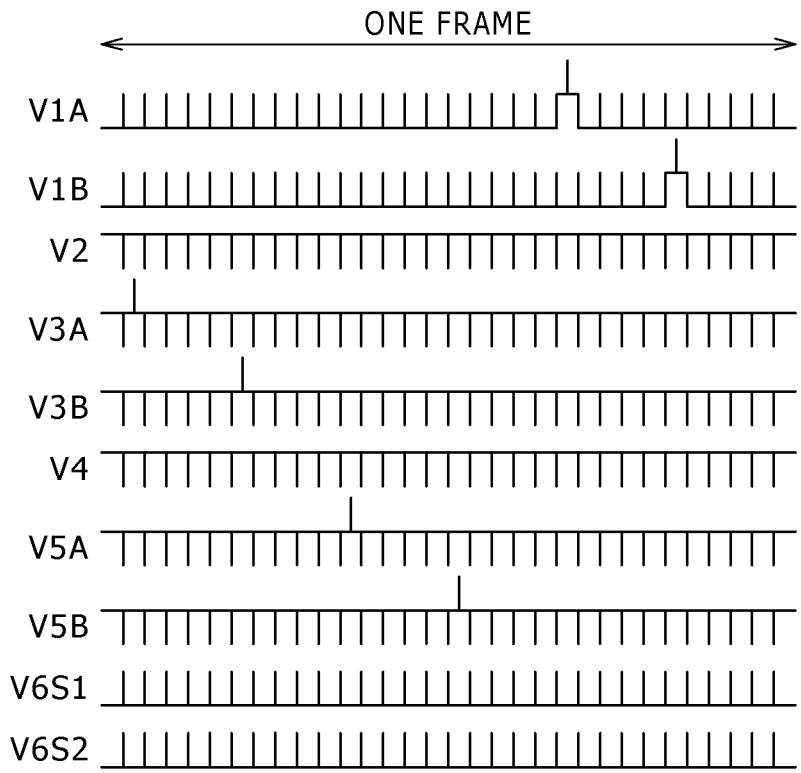
FIG. 2B is a vertical synchronizing timing chart.
Figure 2C:
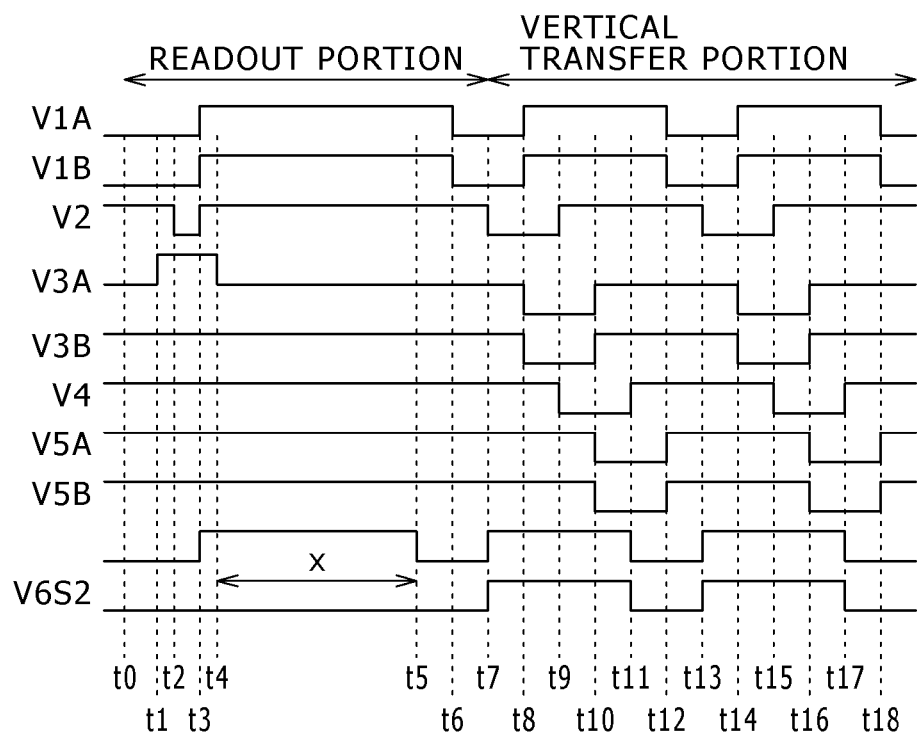
FIG. 2C is a horizontal synchronizing timing chart.
Figure 2D:
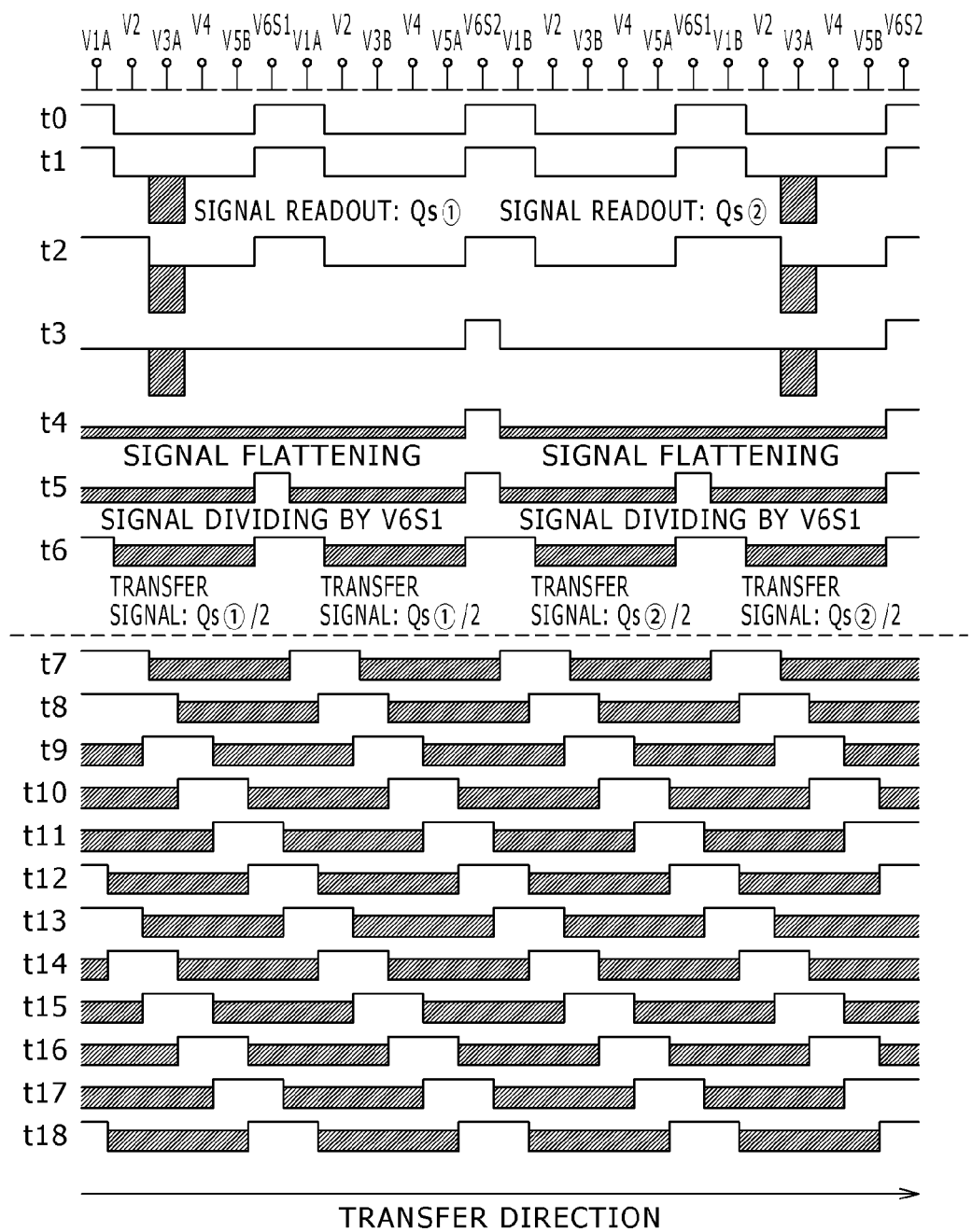
FIG. 2D is a diagram showing the transfer state of charges of the vertical transfer portions.

FIGS. 2A-2D are diagrams for explaining six-field readout employed in the CCD-type solid-state imaging device according to an embodiment of the present invention. FIG. 2A is a diagram of six-field readout in which output (readout) is individually performed in six separate fields, i.e., the first field through sixth field. FIG. 2B is a vertical synchronizing timing chart. FIG. 2C is a horizontal synchronizing timing chart. FIG. 2D shows the transfer state of charges of the vertical transfer portions.

In the embodiment, transfer electrodes V1A, V1B, V3A, V3B, V5A, V5B to which readout clocks are applied are formed so that a readout clock are applied to a pixel of the 1st line by the transfer electrode V5B, to a pixel of the 2nd line by the transfer electrode V3A, to a pixel of the 3rd line by the transfer electrode V1B, to a pixel of the 4th line by the transfer electrode V5A, to a pixel of the 5th line by the transfer electrode V3B, to a pixel of the 6th line by the transfer electrode V1B, to a pixel of the 7th line by the transfer electrode V5A, to a pixel of the 8th line by the transfer electrode V3B, to a pixel of the 9th line by the transfer electrode V1A, to a pixel of the 10th line by the transfer electrode V5B, to a pixel of the 11th line by the transfer electrode V3A, to a pixel on the 12th line by the transfer electrode V1A, to a pixel on the 13th line by the transfer electrode V5B, . . .

In FIG. 2A, only the transfer electrodes V1A, V1B, V3A, V3B, V5A, V5B to which the readout clocks are applied are shown, but transfer electrodes V2 are formed between the 2nd line and the 3rd line, between the 5th line and the 6th line, between the 8th line and the 9th line, and between the 11th line and the 12th line, transfer electrodes V4 are formed between the 1st line and the 2nd line, between the 4th line and the 5th line, between the 7th line and the 8th line, and between the 10th line and the 11th line, transfer electrodes V6S1 are formed between the 6th line and the 7th line and between the 12th line and the 13th line, and transfer electrodes V6S2 are formed between the 3rd line and the 4th line and between the 9th line and the 10th line.

Specifically, in a known CCD-type solid-state imaging device employing a six-field readout method, twelve-phase transfer using twelve transfer electrodes (V1 to V12) of the vertical transfer portions is performed (see FIG. 9A), whereas, in the CCD-type solid-state imaging device according to an embodiment of the present embodiment, six-phase transfer using six transfer electrodes (V1 to V6) of the vertical transfer portions is performed, and, in order to achieve six-field readout in which two pixels of the twelve pixels are outputted, the transfer electrode V1 is divided into a transfer electrode V1A and a transfer electrode V1B, the transfer electrode V3 is divided into a transfer electrode V3A and a transfer electrode V3B, and the transfer electrode V5 is divided into a transfer electrode V5A and a transfer electrode V5B, and further the transfer electrode V6 is divided into a transfer electrode V6S1 and a transfer electrode V6S2 to enable the below-mentioned division transfer.

The charge transfer of the vertical transfer portions in the CCD-type solid-state imaging device having the above construction will be described hereinbelow. For comparison, six-field readout of a known CCD-type solid-state imaging device is first described.

[Six-field readout method of a known CCD-type solid-state imaging device] (see FIGS. 9C and 9D)

In the six-field readout of a known CCD-type solid-state imaging device, timing designated by reference numeral t0 is first switched to timing designated by reference numeral t1 to output charges (Qs) accumulated in the light receiving portions.

The readout at a timing designated by reference numeral t4 is completed after a time period from a timing designated by reference numeral t2 to a timing designated by reference numeral t3 is passed, and the vertical transfer is in a standby state.

In the subsequent periods between a timing designated by reference numeral t5 and a timing designated by reference numeral t15, successively, a high-level potential is applied to the transfer electrode on the forward side in the transfer direction of charges (on state) and simultaneously a low-level potential is applied to the transfer electrode on the backward side in the transfer direction of charges (off state) to perform vertical transfer of charges.

Thus the vertical transfer of charges is performed by twelve-phase transfer using twelve transfer electrodes (V1 to V12) in the six-field readout method of the known CCD-type solid-state imaging device.

[Six-field readout method of the CCD-type solid-state imaging device according to the an embodiment of the present invention] (see FIGS. 2C and 2D)

In the six-field readout of the CCD-type solid-state imaging device according to an embodiment of the present invention, a timing designated by reference numeral t0 is first switched to a timing designated by reference numeral t1 to output charges (Qs) accumulated in the light receiving portions.

A time period from a timing designated by reference numeral t2 to a timing designated by reference numeral t3 is passed, and, in this instance, a low-level potential is applied to a transfer electrode V6S2 as a gate for charge separation (off state) and a high-level potential is applied to a transfer electrode V6S1, a transfer electrode V1A, and a transfer electrode V1B (on state), thus forming a state in which a high-level potential is applied to eleven transfer electrodes (on state), excluding the transfer electrode V6S2. Subsequently, readout of charges is completed at a timing designated by reference numeral t4, and the charges are flattened with respect to the eleven transfer electrodes other than the transfer electrode V6S2.

Then, at a timing designated by reference numeral t5, a low-level potential is applied to the transfer electrode V6S1 (off state), dividing the charges into two portions (Qs/2).

At a timing designated by reference numeral t6, the method is in the initial state similar to the state at the timing designated by reference numeral t0, and the vertical transfer is in a standby state.

In the subsequent periods between a timing designated by reference numeral t7 and a timing designated by reference numeral t18, successively, a high-level potential is applied to the transfer electrode on the forward side in the transfer direction of charges (on state) and simultaneously a low-level potential is applied to the transfer electrode on the downward side in the transfer direction of charges (off state) to perform vertical transfer of charges.

Thus the vertical transfer of charges is performed by six-phase transfer using ten transfer electrodes (V1A, V1B, V2, V3A, V3B, V4, V5A, V5B, V6S1, V6S2) in the six-field readout method of the CCD-type solid-state imaging device according to an embodiment of the present embodiment.

Two portions of the vertical-transferred charges (Qs/2) are mixed together by the horizontal transfer portion (Qs/2+Qs/2=Qs), and the horizontal-transfer is performed by the horizontal transfer portion.

Figure 3:
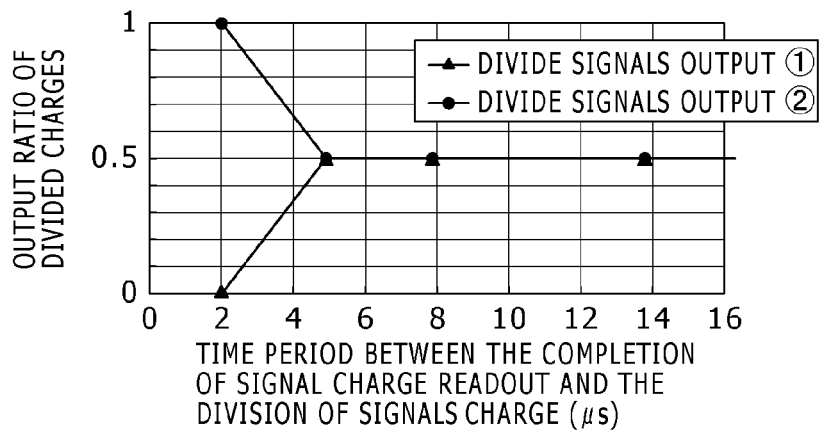
FIG. 3 is a graph showing the relationship between "time period between the completion of signal charge readout and the division of signal charge" and "output ratio of divided charges".

In the six-field readout of the CCD-type solid-state imaging device according to an embodiment of the present invention, when dividing charges, it is necessary to divide charges after a lapse of a predetermined time period from completion of the readout of charges. Specifically, it is necessary to generally ensure about 5 µs for a period between the timing designated by reference numeral t4 and the timing designated by reference numeral t5 (a period indicated by reference character x). The reason for this is as follows. "A time period between the completion of signal charge readout and the division of signal charge" and the "output ratio of the divided charges" have a relationship shown in FIG. 3. Therefore, if a time period between completion of the readout of charges and dividing of the charges is less than about 5 µs, the charges are divided unevenly. Further, in the case of dividing charges unevenly, there is a possibility that one of the charges divided (larger one of the charges divided) determines the amount of charges processed by the vertical transfer portions. Therefore, it is necessary to ensure about 5 µs for a time period between completion of the readout of the charges and dividing of the charges to substantially evenly divide the charges into two portions.

In the CCD-type solid-state imaging device according to an embodiment of the present invention, although a specific embodiment in which the vertical-transferred charges (Qs/2) are mixed by the horizontal transfer portion has been described, it is adequate that the mixing of charges are performed until a preceding step of the horizontal transfer. That is, it is enough to perform the horizontal transfer of the charges in a mixed state by the horizontal transfer portion. It is not necessary to mix the charges in the horizontal transfer portion. For example, the charges may be mixed in a charge accumulation portion, which is formed between the vertical transfer portion and the horizontal transfer portion, and then transferred to the horizontal transfer portion.

The CCD-type solid-state imaging device according to an embodiment of the present invention realizes the six-field readout method by six-phase transfer, which leads to reduce the number of transfer electrodes of the vertical transfer portions. Specifically, a known CCD-type solid-state imaging device performs twelve-phase transfer in the six-field readout method and needs twelve transfer electrodes (V1 to V12), whereas the CCD-type solid-state imaging device according to an embodiment of the present invention realizes six-phase transfer in the six-field readout method by ten transfer electrodes (V1A, V1B, V2, V3A, V3B, V4, V5A, V5B, V6S1, V6S2), and thus the number of transfer electrodes of the vertical transfer portions can be reduced by two in an embodiment of the present invention.

The reduction of the number of transfer electrodes of the vertical transfer portions may remove problems of the increase of cost due to the increase of chip size, the increase of package size due to the increase of the pin number in a package, and the increase of cost due to the increase of the channel number in a vertical driver.

Figure 4A:
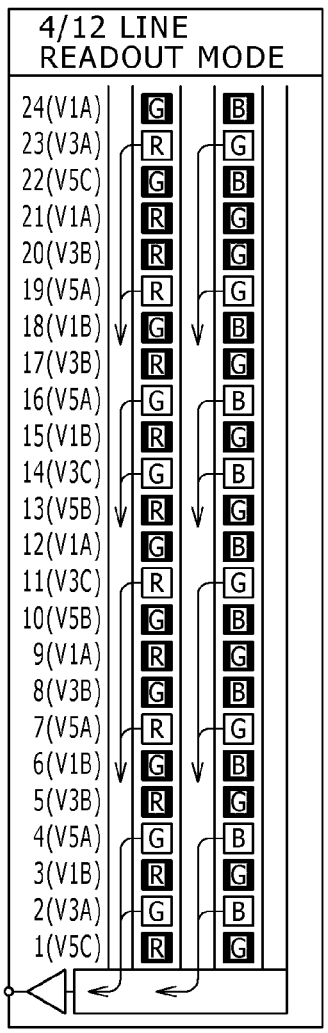
FIG. 4 is a diagram for explaining line thinning in the CCD-type solid-state imaging device of an embodiment of the present invention.
Figure 4B:
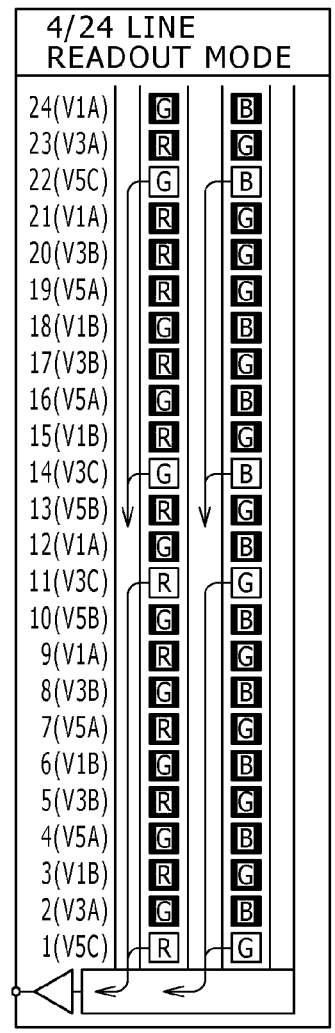
Figure 7F:
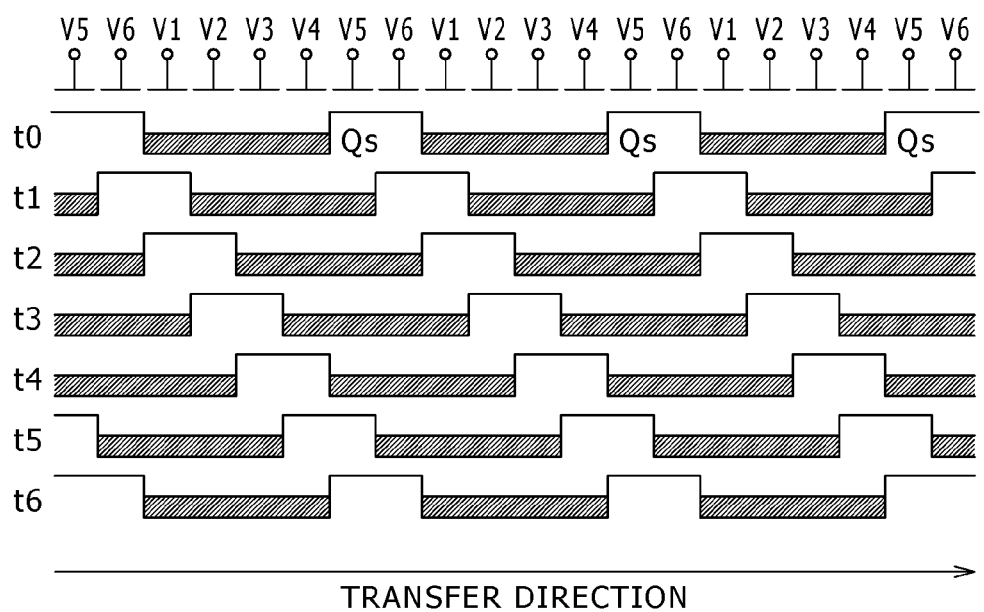
FIG. 7F is a diagram showing the transfer state of charges of the vertical transfer portions corresponding to the horizontal synchronizing timing chart (2).
Figure 8D:
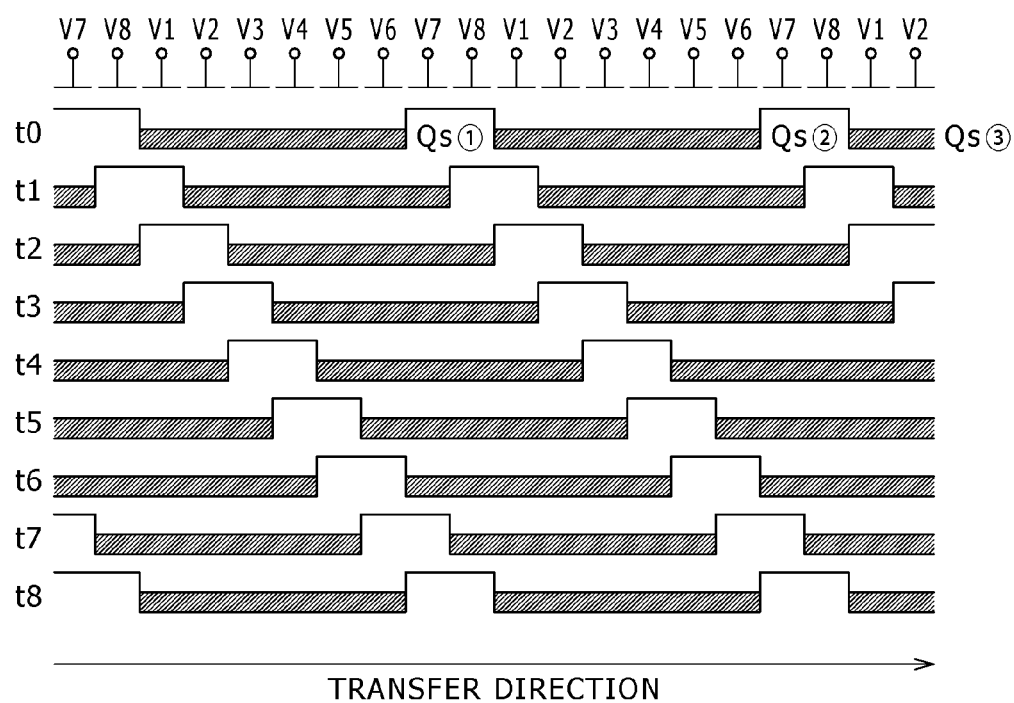
FIG. 8D is a diagram showing the transfer state of charges of the vertical transfer portions.

Furthermore, in digital still cameras, when line thinning is conducted for display on a liquid crystal display monitor or the like or for automatic control (AF, AE), a known CCD-type solid-state imaging device needs sixteen transfer electrodes, but the CCD-type solid-state imaging device of an embodiment of the present invention requires twelve transfer electrodes, and the number of transfer electrodes of the vertical transfer portions may be reduced by four in an embodiment of the present invention (see FIG. 4).

Having described six-field readout method of embodiments of the present invention, the number of transfer electrodes of the vertical transfer portions may also be reduced in an eight-field readout method and others. With respect to the eight-field readout, a known CCD-type solid-state imaging device performs sixteen-phase transfer, whereas the CCD-type solid-state imaging device of an embodiment of the present invention realizes eight-phase transfer. With respect to the four-field readout, a known CCD-type solid-state imaging device performs eight-phase transfer, whereas the CCD-type solid-state imaging device of an embodiment of the present invention realizes four-phase transfer.

The line thinning shown in FIG. 4 or FIG. 10 is an example in which the thinning modes have two types. When the number of thinning modes is increased to three or four, the number of the required transfer electrodes of the vertical transfer portions is increased, and therefore the advantageous effect of the present invention to reduce the number of transfer electrodes is remarkable.

The solid-state imaging device of embodiments of the present invention is advantageous in that the number of transfer electrodes of the vertical transfer portions can be reduced while realizing multi-field readout in which the amount of charges operated by the vertical transfer portions can be increased.

It should be understood by those skilled in the art that various modifications, combinations, sub-combinations and alternations may occur depending on design requirements and other factors insofar as they are within the scope of the appended claims or equivalents thereof.

The present application claims benefit of priority of Japanese patent Application No. 2007-11179 filed in the Japanese Patent Office on Jan. 22, 2007, the entire contents of which are incorporated herein by reference.

What is claimed is:

1. A solid-state imaging device comprising: a plurality of light receiving portions arranged in a matrix of rows and columns; a plurality of vertical transfer portions, formed for each column of the matrix of the light receiving portions, for transferring charges transferred from the light receiving portions in a vertical direction; a horizontal transfer portion for transferring the charges transferred from the vertical transfer portions in a horizontal direction; wherein, transferred signals from a timing signal generating circuit divide substantially evenly the charges transferred to the vertical transfer portions into two after an elapse of more than 5 microseconds from the completion of the transfer of charges to the vertical transfer portions and transfer the divided charges in the vertical direction.

2. The solid-state imaging device according to claim 1, wherein (a) the transfer of charges from the light receiving portions to the vertical transfer portions is performed by dividing into n fields (n≧4), and (b) the vertical transfer portions perform vertical transfer by n-phase driving.

3. The solid-state imaging device according to claim 1, wherein the horizontal transfer portion transfers the divided charges in a mixed state in the horizontal direction.

4. A method for transferring charge by multi-field readout in a solid state imaging device which includes a plurality of light receiving portions arranged in a matrix of rows and columns, a plurality of vertical transfer portions, formed for each column of the matrix of the light receiving portions, for transferring charges transferred from the light receiving portions in a vertical direction, and a horizontal transfer portion for transferring the charges transferred from the vertical transfer portions in a horizontal direction, the method comprising the steps of: transferring the charges from the light receiving portions to a high-level potential portion in the vertical transfer portion; thereafter, after an elapse of more than 5 microseconds from completion of the transfer of the charges to the vertical transfer portions, dividing substantially evenly the charges transferred to the vertical transfer portions into two and transferring the divided charges in the vertical direction, using transferred signals from a timing signal generating circuit; and thereafter, transferring the divided charges in a mixed state in the horizontal direction in the horizontal transfer portion.

* * * * *